L. E. WATERMAN.
LISTER CULTIVATOR.
APPLICATION FILED AUG. 7, 1916.
1,229,355.
Patented June 12, 1917.
5 SHEETS—SHEET 1.
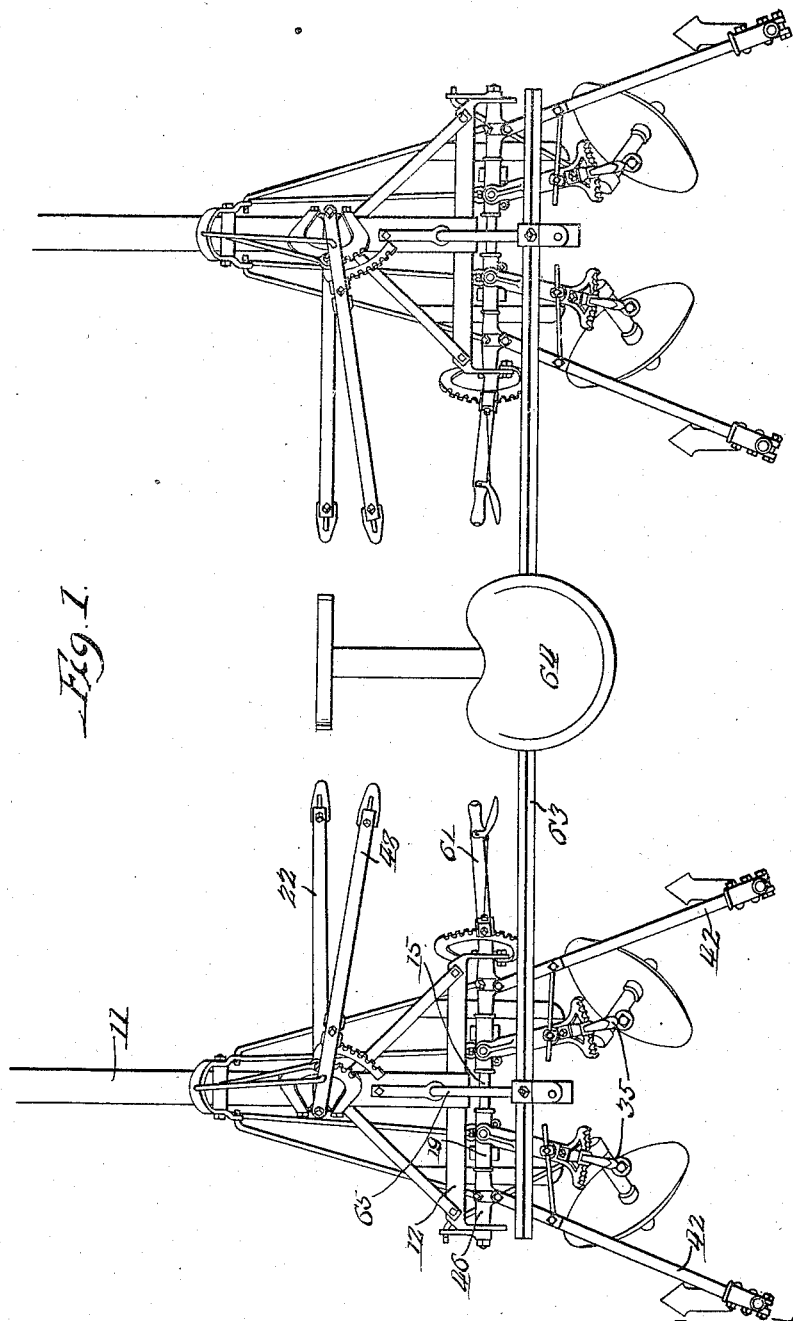
Inventor:
Lewis E. Waterman
By Pond & Wilson
Attys.

L. E. WATERMAN.
LISTER CULTIVATOR.
APPLICATION FILED AUG. 7, 1916.
1,229,355.
Patented June 12, 1917.
5 SHEETS—SHEET 2.
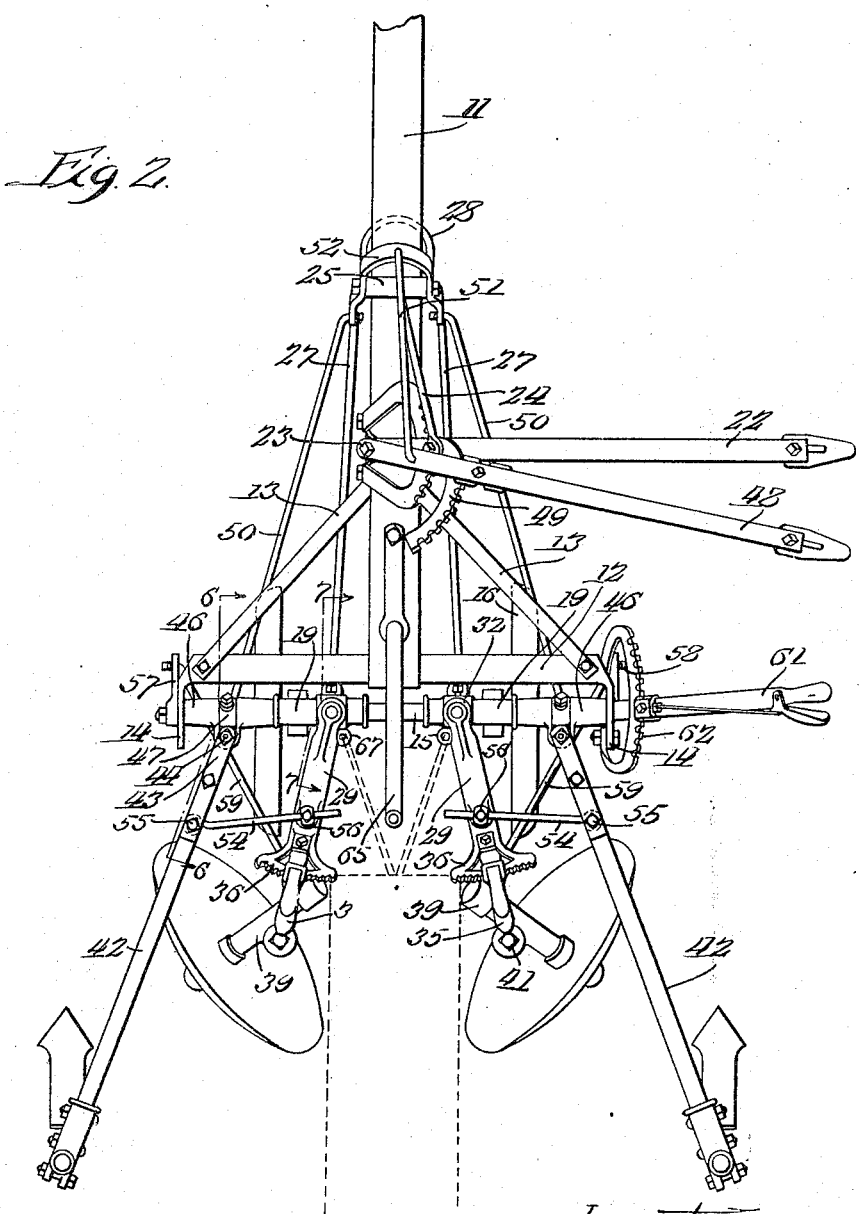

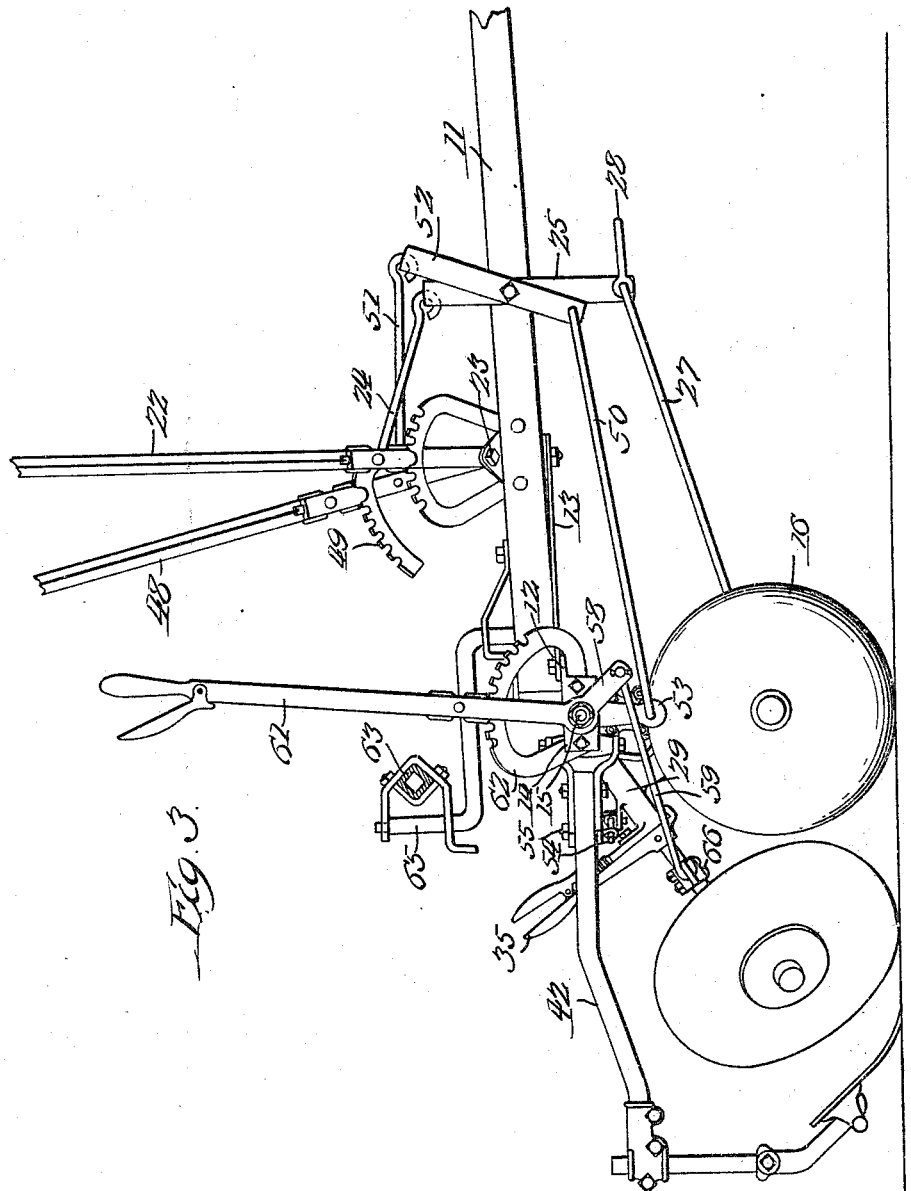

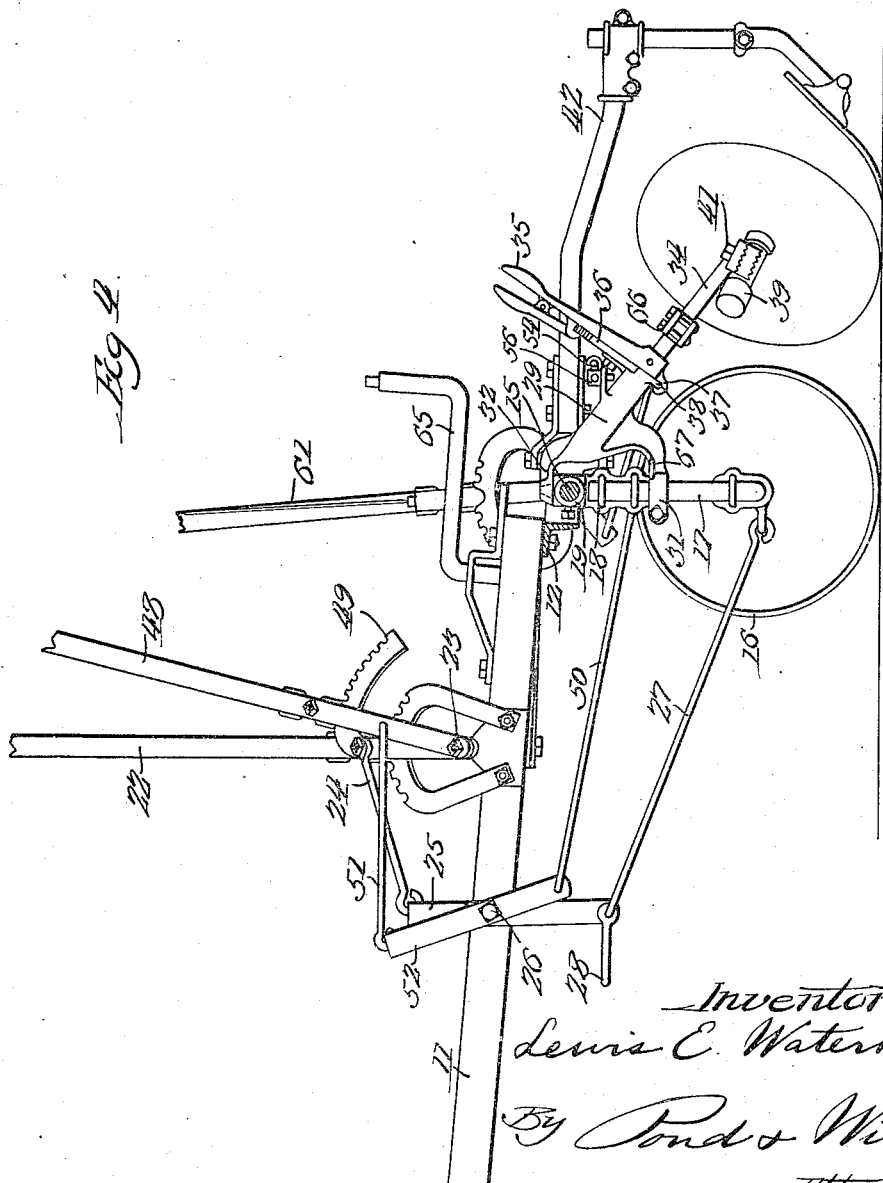

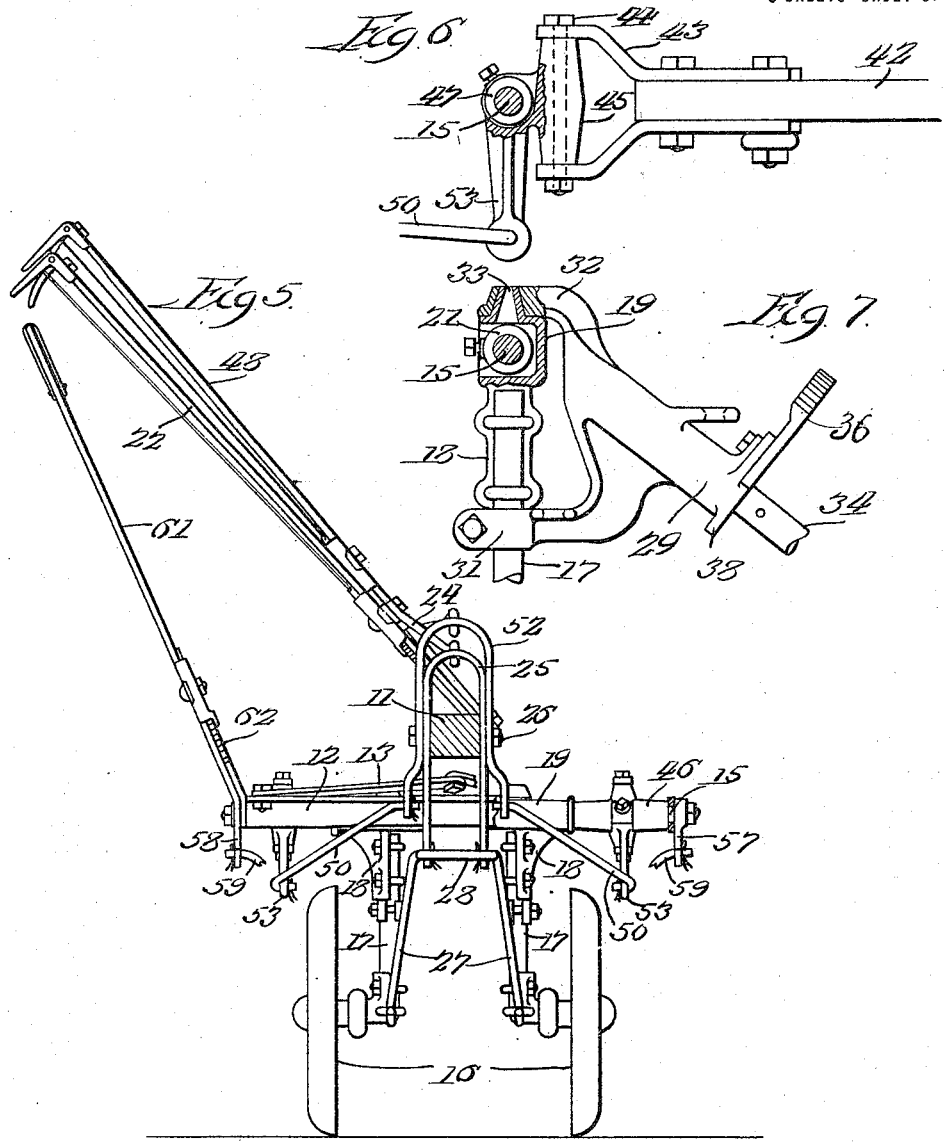

UNITED STATES PATENT OFFICE.

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

LISTER-CULTIVATOR.

1,229,355.   Specification of Letters Patent.   Patented June 12, 1917.

Application filed August 7, 1916. Serial No. 113,611.

*To all whom it may concern:*

Be it known that I, LEWIS E. WATERMAN, a citizen of the United States, residing at Rockford, in the county of Winnebago and State of Illinois, have invented certain new and useful Improvements in Lister-Cultivators, of which the following is a specification.

This invention relates in general to cultivators and has more particular reference to lister cultivators adapted for cultivating two rows of listed plants simultaneously.

Cultivators of this type are characterized by the provision of an independent gang of cultivating devices for each row, joined by a spreader bar which holds them in proper spaced relation and also supports the driver. Each gang comprises, in general, some form of wheel-supported frame to which is attached a plurality of cultivator rigs or tool-carrying frames adapted to be adjusted to meet the requirements for cultivating listed corn at different periods in its growth.

My invention aims, primarily, to enable a wider range of adjustment of the cultivating tools than has heretofore been possible and to effect this result by the provision of simplified and improved construction. My invention also provides novel means for controlling and adjusting the cultivating tools so that the same may be easily and quickly adjusted and set in any desired working position.

To these ends my invention provides in general a simplified and improved frame structure, cultivating tools mounted on the frame in a novel manner enabling each tool-carrying means to be independently swung horizontally and vertically, means for adjusting the cultivating devices laterally by rocking a transverse bar on which the devices are mounted, an improved lever adjusting mechanism for raising and lowering the cultivating devices independently and in unison, an improved disk-carrying frame in connection with the carrying wheel standard, and other features which will be apparent as the invention becomes better understood by reference to the following description when considered in connection with the accompanying drawings, in which—

Figure 1 is a plan view of a two-row lister cultivator embodying my improvements;

Fig. 2 is an enlarged plan view of one of the cultivator sections;

Fig. 3 is a side elevation of one of the cultivator sections;

Fig. 4 is a longitudinal sectional view through the cultivator;

Fig. 5 is a front elevation of a cultivator section; and

Figs. 6 and 7 are detail sectional views taken on the lines 6—6 and 7—7, respectively of Fig. 2.

Since the cultivating gangs or sections, each adapted to cultivate a single row of plants, are of similar construction, a description of but one section will suffice. The frame comprises a draft tongue 11 the rear end of which is bolted to an angle iron cross bar 12 braced at its end portions by bars 13 and having its ends 14 turned rearwardly and adapted to support a rocking bar 15. To this rocking bar is attached the cultivating devices and carrying wheels, and the tongue serves as a support for certain of the adjusting levers, all of which will be presently fully described.

The carrying wheels 16 which support the frame are mounted on upright standards 17 rigidly secured at their upper ends by means of U-bolts to the depending portions 18 of sleeve brackets 19 rotatably mounted on the rocking bar 15. Each of the brackets is shaped intermediate its ends to accommodate a collar 21, shown in Fig. 7, secured by means of a set screw to the rocking bar 15 whereby the collar is held against longitudinal movement but is capable of rotative movement on said bar. By reason of this construction the wheel standards may be easily adjusted toward and from each other and set in the proper relation for treading in a single furrow. The wheels may also be swung backwardly and forwardly on the rocking bar 15 as a fulcrum to raise and lower the cultivating device connected therewith as will be presently described. This movement of the wheel standards is controlled by means of a hand lever 22 pivotally mounted at 23 on the tongue 11, coöperating in the usual manner with a notched segment carried by the tongue and pivotally connected to the lower end of each standard through the agency of a link 24 connecting the lever to the upper end of a yoked lever 25 straddling the tongue and pivotally connected intermediate its ends at 26 thereto and in turn connected from each of its arms by means of links 27 to the lower ends of the wheel standards. A draft clevis 28 mounted on the forward ends of the links 27 provides means for attachment of the whiffletree.

The tools employed for cultivating are preferably a pair of disks and a pair of shovels, one of each being adapted to operate on each side of a row of plants and to be capable of a wide range of adjustability to meet the varying requirements of cultivation at different times in the growth of the plants. The disk-carrying means are connected with the wheel standards so as to be raised and lowered thereby when the wheels are moved backwardly and forwardly by adjustment of the lever 22. Independent means for carrying each disk is pivotally connected to a bracket 19 and wheel standard 17 and extends rearwardly and downwardly from the bracket so as to be capable of transverse swinging movement to adjust its disk laterally. Each disk is mounted on the rear end of this carrying means on an axis transverse to the longitudinal axis thereof and is rotatably adjustable on said longitudinal axis and also on an upright axis so that the disk has a universal adjustment, enabling it to be set in practically any desired position with respect to inclination, working angle and proximity to the plants. Each disk-carrying means comprises a tubular member 29 inclined downwardly and rearwardly from the rocking bar and formed with an integral yoked forward end, the lower arm 31 of which embraces the standard 17 in abutting relation with the lower end of the portion 18 and the upper arm 32 of which is provided with a cone-shaped socket fitting the tapered pivot stud 33 formed integral with the bracket 19 co-axially with the standard 17. The sleeve member is thus held in fixed relation to the wheel standard but is capable of lateral swinging movement on the upright axis of said standard. A rod 34 journaled in the sleeve member 28 and equipped at its rear end with a disk, is held in operative relation with the sleeve member through the intermediary of a hand lever 35 fixed to the rod. This lever adjustably coöperates with a notched segment 36 fixed to the sleeve member 29 and is held in coöperative relation therewith by the engagement of a depending guide 37 on the lever with a stud 38 on the sleeve member. Attachment of the disk to the rod 34 through the intermediary of a spindle bracket 39 pivotally connected to the rear end of said rod by a bolt 41 on an upright axis enables the disk to be rotatably adjusted about the axis of the bolt and to be set at either the inner or outer side of the longitudinal axis of the disk-carrying means. That is, the disk may be set to turn the ground inwardly, as shown in the drawings, or to turn it outwardly when set at the inner side of its carrying means. It will be apparent from the foregoing that the disks are capable of a wide range of adjustment, including vertical adjustment, by means of the hand lever 22, adjustment laterally of the carrying frame by means of the hand lever 35, and adjustment about the upright pivot bolt 41.

The shovel cultivating means comprises a pair of beams 42, each equipped at its rear end with a cultivating shovel and pivotally connected at its forward end on an upright axis with the rocking bar 15 at the outer sides of the brackets 19. The beams may be provided with yoked forward ends 43 which straddle and are secured by means of a pivot bolt 44 to an upright post 45 formed integral with a sleeve 46 rotatably mounted on the rocking bar 15. As in the case of the brackets 19, the central portion of each bracket 46 is shaped to accommodate a collar 47 secured by a set screw to the rocking bar for holding the bracket against lengthwise movement thereon. The brackets 46 may be rocked on the bar 15 in unison with or independently of the brackets 19 by means of the hand lever control on the tongue. For this purpose a second hand lever 48 mounted on the pivot 23 and coöperating with a notched segment 49 fixed to and carried by the lever 22 is connected by means of a link 51 to a second yoked lever 52 mounted on the pivot 46 and connected at its lower ends by means of links 50 to the lower end of depending arms 53 formed integral with the brackets 46. It will be noted that when the lever 48 is locked with respect to the lever 22 the latter may be adjusted to raise and lower both the disk and shovel cultivating devices in unison. Should it be desired to adjust the cultivating shovels vertically with respect to the disks, the lever 48 may be adjusted upon and relatively to the lever 22.

For the purpose of holding the cultivating devices spaced in any desired relation and for adjusting the devices laterally, I have provided novel means which will now be described. Each adjacent disk and shovel carrying frame is adjustably connected so that these frames will swing in unison about their upright pivotal mountings and may be adjusted toward and from each other. For this purpose a link 54 is pivotally connected to the beam at 55 and adjustably connected to a swivel block 56 mounted on the sleeve member 29. By reason of this construction the shovel and disk may be adjusted laterally toward and from each other so that the shovel may operate at any desired position on the crest or sides of a ridge and may even be swung to an inner position in close proximity to the plants which is often desirable in the first cultivation. In order to adjust each connected disk and shovel frame laterally toward and from each other, I have provided a simple connection between the rocking shaft 15 and one of the tool-carrying frames whereby when the shaft is rocked the cultivating tools on each side of the row of plants will be adjusted toward and away therefrom in unison. This connection is established through the agency of arms 57 and 58 secured to the ends of the rocking shaft 15 and connected by means of links 59 to the rods 34. It will be apparent that by reason of this arrangement each adjacent disk and shovel may be swung outwardly in unison by rocking the shaft 15 in one direction and inwardly by rocking the shaft in the opposite direction. A hand lever 61, in this instance made integral with the arm 58, co-operates with a notched segment 62 bolted to the frame and is adapted to be adjusted for rocking the bar 15. The relation of each connected disk and shovel frame to the lever 61 may be varied by moving the collars 66 lengthwise on the rods 34.

From the foregoing, it will be apparent that the cultivating devices may be very easily adjusted to stir up or turn over the ground in almost any manner desired for lister cultivating, and because of the fact that it is desired to readjust the tools at each new cultivation, it is obvious that ease and simplicity in making such adjustments are extremely important. During the first cultivation the usual shield indicated in dotted lines in Fig. 2 may be attached to the wheel standards at the points 67 for the purpose of shielding the small plants from the earth being turned by the disks. When commencing to cultivate, the lever 22 is unlatched to move the cultivating tools into the ground and the draft through the links 27 assists in forcing the disks into the ground, whereupon they are locked in position by latching this lever in the desired notch.

The two cultivating sections or frames are connected and held in spaced relation by a spreader bar in the usual manner. The spreader bar 63 equipped with a seat 64 is pivotally mounted at its end portions on links 65 in turn pivoted respectively to the tongues of said frames. This establishes a flexible connection between the cultivator shovels so that they may shift laterally and the driver is carried centrally between the sections so as to be in convenient reach of the various hand levers.

I claim:

1. In a lister cultivator, the combination of a frame, a pair of tool-carrying frames pivotally connected at their forward ends on upright axes to the frame on each side of the medial line thereof, the inner tool-carrying frame of each pair being equipped at its rear end with a disk and the outer frame with a cultivator shovel, and means adjustably connecting the frames of each pair whereby the frames may be relatively adjusted laterally and each pair moved in unison laterally on its axis.

2. In a lister cultivator, the combination of a draft tongue, a transverse member connected with the rear end thereof, a pair of tool-carrying frames independently and pivotally connected at their forward ends on upright axes to said member on each side of the tongue, the inner tool-carrying frame of each pair being equipped at its rear end with a disk and the outer frame with a cultivating shovel, and operating means including a lever, and connections between said lever and said tool-carrying frames whereby said pairs of frames may be adjusted as a unit laterally toward and from each other.

3. In a lister cultivator, the combination of a frame, a transverse bar, a plurality of sleeve brackets rotatably mounted on said bar, a tool-carrying frame pivotally connected at its forward end on an upright axis to each of said brackets and equipped at its rear end with a cultivating tool whereby the tools may be swung vertically on said transverse bar and horizontally on said upright axes, means for maintaining the tool-carrying frames in predetermined relative relation with respect to lateral swinging movement, and means operable between the transverse bar and said tool-carrying frames to swing the latter horizontally upon rocking said bar.

4. A lister cultivator comprising a draft tongue, a transverse bar rigidly attached to the rear end of the tongue and provided with rearwardly extending ends, a transverse rocking bar mounted on said ends of the transverse bar, a plurality of tool-carrying frames pivotally mounted on the rocking bar, a connection between said rocking bar and the tool-carrying frames for adjusting the same upon rocking movement of the bar, and means for rocking the bar.

5. In a lister cultivator, the combination of a frame, a transverse rocking bar mounted thereon, a cultivating device comprising a pair of tool-carrying members independently pivotally mounted on the rocking bar and also pivoted on upright axes whereby the tool-carrying members may be swung laterally on said pivots and vertically on the rocking bar, a connection between each tool-carrying member and the rocking bar whereby the tool-carrying members will be moved laterally toward and away from each other by rocking the bar, and means for rocking said bar and holding it in fixed position.

6. In a lister cultivator, the combination of a frame, a transverse rocking bar mounted thereon, a pair of tool-carrying frames pivotally mounted on each end portion of the rocking bar so as to be capable of vertical and horizontal swinging movement, a connection between each pair of frames so that the same will swing laterally in unison, a connection between the rocking bar and the said frames whereby the latter will be swung laterally by rocking said bar, means for rocking the bar, and means for swinging the said frames vertically.

7. In a lister cultivator, the combination of a frame, a tool-carrying device comprising a sleeve member extending in the direction of the line of draft and pivotally connected at its forward end to the frame on an upright and a transverse axis and extending rearwardly and downwardly from its mounting, a member rotatably mounted in said sleeve member and equipped at its rear end with a cultivating tool, and an adjustable connection between the sleeve member and said tool-equipped member for rotatably adjusting the member to change the inclination of the disk.

8. In a lister cultivator, the combination of a frame, a sleeve bracket mounted on the frame to swing on a horizontally disposed axis, a carrying-wheel standard fixed to said bracket, a tool-carrying frame pivotally connected with said bracket on an upright axis and extending rearwardly therefrom and including a tool-carrying member rotatable on the longitudinal axis of said frame, means for rotatably adjusting the said member to adjust the tool with respect to the vertical, means for moving the tool-carrying frame on its upright axis to swing the tool laterally, and means for swinging said bracket on its horizontally disposed axis.

9. In a lister cultivator, the combination of a frame equipped with a draft tongue, a transverse rocking bar mounted on the frame, a pair of tool-carrying frames loosely mounted on each end portion of the rocking bar and capable of swinging laterally on upright axes, carrying wheels connected with the rocking bar so as to swing forwardly and backwardly about the axis thereof, means for rocking said bar, a connection between the rocking bar and tool-carrying frames whereby the same will be swung laterally by rocking movement of the bar, and lever-operating means mounted on the tongue and connected with the tool-carrying frames and carrying wheels for moving the same in unison about the axis of said bar to raise and lower the tools.

10. The combination of a frame, a transverse bar thereon, a bracket rotatably mounted on the bar, a yoked member straddling the bracket and pivotally connected at its ends therewith on an upright axis and provided with a rearwardly extending sleeve portion, a rod journaled in said sleeve portion and equipped at its rear end with a disk, an adjustable connection between the said rod and sleeve for rotatably adjusting the former to vary the inclination of the disk, and means for swinging the disk-carrying means on its upright axis and on the axis of the transverse bar for adjusting the disk in a vertical and a horizontal plane.

11. In a cultivator, the combination of a frame, a sleeve member extending in the line of draft and pivotally connected at its forward end with the frame so that its rear end may swing in a vertical and a horizontal plane, a rod journaled in the sleeve member and equipped at its rear end with a disk on a horizontally disposed axis transverse to the line of draft, a connection between the rod and sleeve member for rotatably adjusting the rod to vary the inclination of the disk, and means for swinging the sleeve vertically and horizontally.

12. The combination of a frame, a bracket pivotally connected thereto on a horizontal axis transverse to the line of draft and provided with a depending portion, a carrying-wheel standard attached to said depending portion, and disk-carrying means having a yoked forward end one arm of which is journaled on the upright portion of said standard and the other of which is pivotally connected with the top of the bracket coaxially with said standard so that the disk-carrying means is capable of swinging horizontally and vertically on said pivots.

13. In a lister cultivator, the combination of a frame, a transverse rocking bar mounted thereon, a plurality of tool-carrying means independently pivotally mounted on the rocking bar on upright axes and adapted to swing vertically on the axis of said bar, means for swinging the tool-carrying means on the bar to raise and lower the tools, connections between the bar and said tool-carrying means whereby the latter will be swung laterally on their upright axes when the bar is rocked, and means for rocking the bar.

14. In a lister cultivator, the combination of a frame, a transverse rocking bar mounted thereon, a plurality of tool-carrying means independently pivotally mounted on the rocking bar on upright axes, and connections between the bar and the tool-carrying means whereby the latter may be swung laterally by rocking the bar.

15. The combination of a frame, a transverse rocking bar mounted thereon, a pair of tool-carrying frames independently pivotally mounted on each end portion of the rocking bar on upright axes, an adjustable connection between the tool-carrying frames of each pair whereby they will be swung laterally in unison and are adjustable toward and from each other, a connection between the rocking bar and each pair of tool-carrying means whereby upon rocking the bar in one direction each pair will be swung outwardly away from each other and upon rocking the bar in the opposite direction each pair will be swung inwardly, and means for rocking the bar.

16. In a lister cultivator, the combination of a frame equipped with a draft tongue, a pair of tool-carrying frames independently pivotally mounted on the frame on each side of the tongue to swing vertically with respect to the frame, carrying wheels connected with the frame and movable backwardly and forwardly relatively thereto, a pair of members pivotally mounted intermediate their ends on the tongue, a link connection between one member and the wheels and one of the tool-carrying frames of each pair, a link connection between the other member and the tool-carrying means of each pair, and means for rocking said members in unison and for rocking one member independently of the other.

17. In a lister cultivator, the combination of a frame equipped with a draft tongue, a pair of tool-carrying frames independently pivotally mounted on the frame on each side of the tongue to swing vertically with respect to the frame, carrying wheels connected with the frame and movable backwardly and forwardly relatively thereto, a pair of members pivotally mounted intermediate their ends on the tongue, a link connection between one member and the wheels and one of the tool-carrying frames of each pair, a link connection between the other member and the other tool-carrying means of each pair, a pair of hand levers, a connection between the hand levers so that they will operate in unison and so that one may be operated independently of the other, and separate link connections between each lever and one of said members pivoted on the tongue whereby upon operating of the levers in unison the cultivating devices will be moved vertically in unison and upon operating one lever independently one of the tool-carrying means of each pair will be vertically moved.

18. In a lister cultivator, the combination of a frame, a bracket pivotally connected thereto on a horizontal transverse axis, an upright carrying-wheel standard disposed beneath and rigidly connected to the bracket, a disk-carrying device pivotally connected at its forward end with the bracket on an upright axis and extending rearwardly and downwardly therefrom and equipped at its rear end with a disk, said disk being arranged on a horizontally disposed axis and adjustable on the longitudinal axis of said disk-carrying means, means for adjusting the disk on said longitudinal axis and holding it in an adjusted position, means for swinging the disk-carrying means laterally on its upright axis, and means for swinging the bracket on its pivot to raise and lower the disk.

LEWIS E. WATERMAN.

Copies of this patent may be obtained for five cents each, by addressing the "Commissioner of Patents, Washington, D. C."